Patented June 23, 1942

2,287,668

UNITED STATES PATENT OFFICE

2,287,668

PROCESS OF EQUALIZING THE COLOR IN PINEAPPLES

Bernard J. Butler, Paia, Territory of Hawaii, assignor to Maui Pineapple Company, Ltd., Paia, Territory of Hawaii, a corporation of Hawaii No Drawing. Application August 19, 1940, Serial No. 353,303

3 Claims. (Cl. 99—100)

The invention relates to improvements in processes of treating pineapples and it has for its principal object to provide simple and effective means for equalizing the color of the fruit and thus improve its appearance.

Numerous methods have heretofore been developed to improve the appearance of pineapple during the process of canning to thereby present a more appealing product to the public. The ultimate aim of these methods, which have been only partially successful, is the removal of the white spots which are usually interspersed throughout the fruit. It is generally recognized that these so-called white spots are minute air pockets found in the inter-cellular spaces of the vascular bundles forming the pineapple and most prominent between the core and the blossom cup at the outer edge of each fruit. Since these white spots are but bubbles or air pockets, the palatability or quality of the fruit is not impaired or diminished by their presence, but it is commonly believed by the general public that fruit containing white spots is of an inferior grade. The removal of the air pockets imparts a rich golden translucent appearance to a pineapple section and thereby greatly enhances its marketability.

In the past, cans of fruit at atmospheric temperature and containing no syrup have been treated with a vacuum of greater or less intensity in an endeavor to equalize the color of the fruit, but such treatment does not result in eliminating a sufficient quantity of the white spots to impart to the fruit the rich translucent appearance desired. However, I have discovered that, of the pineapple is subjected to a vacuum which is so correlated to the temperature of the fruit that the aqueous content thereof is caused to flash or be suddenly converted into vapor, the white spots may be effectively removed. The relation between the temperature of the fruit and the reduced pressure or vacuum to which it is subjected to cause flashing of the liquid content thereof is practically the same as the relationship between pressures and temperatures to cause the boiling of water, as the liquid content of the fruit is mainly water.

A preferred method embodying the present invention is to place sliced fruit, such as pineapple, in open cans without the presence of syrup. The cans of unsyruped fruit slices are then subjected to heat of a predetermined temperature which may be varied within certain limits to be hereinafter pointed out. This step of heating the fruit is followed by placing the cans in a chamber of reduced pressure, the degree of vacuum in the chamber being so correlated to the temperature of the fruit as to cause flashing, i. e., the sudden conversion of the aqueous content of the fruit into vapor. By establishing this relationship between the degree of temperature and vacuum, a pressure differential is attained which results in the removal of substantially all the air in the pockets of the fruit.

It is not essential to the successful use of the invention to heat the fruit before subjecting it to a vacuum of the intensity required to produce flashing because flashing of the aqueous content of fruit at atmospheric temperature, say 80° F., may be accomplished by subjecting the fruit to twenty-nine and one-half inches of vacuum, for example. However, as it is probably not economically feasible from a commercial view-point to subject the fruit to such a high vacuum, it is preferable to elevate the temperature of the fruit to such a degree that a vacuum which can be easily produced and maintained may be employed.

The fruit may be heated to relatively high temperatures, but preferably not above 212° F., and then subjected to a vacuum of relatively low degree to produce flashing. For example, if the temperature of the fruit be elevated to 200° F., a vacuum of one-half inch will produce the desired result. While the fruit may be subjected to a higher, but not lower, vacuum than that required to produce flashing at a predetermined temeprature, care should be taken than the vacuum should not be of such magnitude that the flashing will be so violent as to disrupt the fruit.

It may, at times, be found convenient and expedient to simultaneously subject the fruit to a predetermined or given correlated heat and vacuum in order to produce flashing. However, it has been found that the fruit may be raised to a given heat in a shorter time if not simultaneously treated to heat and vacuum, and for this reason it is preferred to subject the fruit to successive independent steps of first heating and then vacuumizing.

After the above recited and preferred process has been accomplished, the fruit is then syruped in the conventional manner and the cans are properly sealed preparatory to shipment or delivery.

What I claim is:

1. The process of removing natural white spots from pineapple which comprises subjecting the pineapple to a vacuum of an intensity sufficient to cause flashing of the aqueous content of the fruit.

2. The process of removing natural white spots from pineapple which comprises heating the pineapple and then subjecting it to a vacuum correlated to the temperature of the fruit to produce flashing of the aqueous content thereof.

3. The process of removing natural white spots from pineapple which comprises heating the fruit to a temperature less than 212° F., and then subjecting the fruit to a vacuum correlated to said temperature to effect flashing of the aqueous content of the fruit.

BERNARD J. BUTLER.